United States Patent
Virtanen et al.

(10) Patent No.: US 11,242,463 B2
(45) Date of Patent: *Feb. 8, 2022

(54) SELF-STRATIFYING COATINGS

(71) Applicant: Tesla Nanocoatings, Inc., Massillon, OH (US)

(72) Inventors: Jorma Virtanen, Massillon, OH (US); Theodore Hammer, Akron, OH (US)

(73) Assignee: Tesla Nanocoatings, Inc., Massillon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,613

(22) Filed: May 28, 2021

(65) Prior Publication Data

US 2021/0284847 A1 Sep. 16, 2021

Related U.S. Application Data

(63) Continuation of application No. 16/814,334, filed on Mar. 10, 2020, now Pat. No. 11,021,614.

(51) Int. Cl.

| | |
|---|---|
| *C09D 5/10* | (2006.01) |
| *C09D 5/00* | (2006.01) |
| *C09D 7/40* | (2018.01) |
| *C09D 4/06* | (2006.01) |
| *C09D 163/00* | (2006.01) |
| *C09D 183/16* | (2006.01) |
| *C09D 135/08* | (2006.01) |
| *C09D 7/61* | (2018.01) |
| *C08K 3/04* | (2006.01) |
| *C09D 133/10* | (2006.01) |
| *C09D 175/02* | (2006.01) |
| *C09D 133/08* | (2006.01) |
| *C08K 3/08* | (2006.01) |

(52) U.S. Cl.
CPC ............ *C09D 5/106* (2013.01); *C08K 3/04* (2013.01); *C09D 4/06* (2013.01); *C09D 5/002* (2013.01); *C09D 7/61* (2018.01); *C09D 7/70* (2018.01); *C09D 133/08* (2013.01); *C09D 133/10* (2013.01); *C09D 135/08* (2013.01); *C09D 163/00* (2013.01); *C09D 175/02* (2013.01); *C09D 183/16* (2013.01); *C08K 2003/0893* (2013.01)

(58) Field of Classification Search
CPC .. C09D 133/00; C09D 133/08; C09D 133/10; C09D 5/002; C09D 5/106; C09D 7/61; C09D 7/70; C09D 135/08; C09D 163/00; C09D 175/02; C09D 183/16; C08K 3/04

See application file for complete search history.

(56) References Cited

U.S. PATENT DOCUMENTS

| | | | | |
|---|---|---|---|---|
| 4,086,096 A | * | 4/1978 | McLeod | C09D 5/106 106/1.17 |
| 4,110,117 A | * | 8/1978 | McLeod | C09D 5/084 106/1.17 |
| 5,977,285 A | * | 11/1999 | Ernst Moos | C08G 18/289 427/422 |
| 9,000,069 B1 | * | 4/2015 | Mackulin | C09D 133/10 523/201 |
| 9,193,886 B2 | | 11/2015 | Soucek | |
| 9,725,603 B2 | * | 8/2017 | Virtanen | C07F 7/1804 |
| 11,021,614 B1 | | 6/2021 | Virtanen | |
| 2011/0028612 A1 | * | 2/2011 | Templeman | C09D 183/04 524/114 |
| 2012/0083551 A1 | * | 4/2012 | Soucek | C08G 59/5086 523/400 |

FOREIGN PATENT DOCUMENTS

| | | | |
|---|---|---|---|
| WO | 2016089199 A1 | 12/2015 | |
| WO | 2016089199 A1 | 6/2016 | |
| WO | WO-2016089199 A1 * | 6/2016 | ........... C09D 167/00 |

OTHER PUBLICATIONS

"Corrosion Resistance of Self-Stratifying Coatings using Fluorovinyl Ether/BPA Epoxide" Progress in Organic Coatings 133 (2019) pp. 145-153.
"Migration of Fluorinated Alkyd and Fluorinated Tung Oil Additives for Partially Self-Stratifying Coatings" Progress in Organic Coatings 133 (2019) pp. 406-417.
"Resin Migration Tracking via Real-Time Monitoring FTIP-ATR in a Self-Stratifying System" Progress in Organic Coatings 131 (2019) pp. 159-164.
"Self-Stratifying Epoxy-Silicone Coatings" Progress in Organic Coatings 103 (2017) pp. 101-110.
International Search Report for PCT/US2021/021528 dated Jun. 28, 2021.
International Written Opinion or PCT/US2021/021528 dated Jun. 28, 2021.

* cited by examiner

*Primary Examiner* — Christopher M Rodd
(74) *Attorney, Agent, or Firm* — Emerson Thomson Bennett; Daniel A. Thomson

(57) ABSTRACT

A self-stratifying anticorrosive coating is described herein, including a zinc-rich epoxy, a curing agent chosen from the group consisting of amines, thiols, phenols, and carboxylic anhydrides, a binding agent chosen from the group consisting of aminoalkyl dialkoxysilane, dimethoxysilane, and aminoalkyl trialkoxysilane, a graphitic material, a solvent, a water scavenger, and a moisture-cured siloxane.

20 Claims, 8 Drawing Sheets

SELF-STRATIFYING COATINGS

This application is a continuation of U.S. Ser. No. 16/814,334, filed Mar. 10, 2020, now U.S. Pat. No. 11,021,614, issued Jun. 1, 2021. Self-stratifying coatings are commonly made of non-miscible, or poorly miscible, components that are mixed with the help of a solvent. Thermodynamics is the driving force for the separation of the components after some or all of the solvent has evaporated. Even if the phase separation happens, and creates a layered structure, there is no guarantee that the primer will adhere to the substrate. Instead the topcoat may separate into two layers, one against the substrate, and the other one on the top. This is undesirable if galvanic protection is going to be used, because an electrically insulating layer on the substrate prevents cathodic protection.

I. BACKGROUND

Surface free energy differences may also be used to drive phase separation. The zinc-rich primer is comprised of a high surface energy resin such as epoxy or urethane. The topcoat is comprised of a low surface resin which favors stratification. The resins might include silicone or fluorine functionality to enhance stratification. Examples include amine or epoxy functional polysiloxanes, silicone-modified alkyls, fluoroethylene vinyl ether resins, and seed oils.

Anticorrosive coatings set further requirements for self-stratifying systems. In the best case the primer should provide cathodic protection. Conventionally, cathodic protection is achieved by mixing sacrificial metal particles, such as zinc, magnesium, or aluminum particles. These might impede phase separation. Even a partial separation of the top coat on the surface of the substrate would probably destroy the cathodic protection, because the electrical connection between the sacrificial metal particles and substrate might be lost.

II. SUMMARY

The present teaching solves all these problems. The primer is an advantageously zinc-rich epoxy, in which the polymer matrix is made conducting with a graphitic material, such as carbon nanotubes (CNT) or graphene. The topcoat is moisture-cured siloxane. Siloxane monomers have low viscosity and may be used as solvents for the primer in addition to other solvents. Water will be excluded from the interior of the coating after application, and siloxane polymerization may only happen in the coating-air interface due to the moisture in the air. This will lead to the separation of the primer and topcoat.

III. FIGURES

The present teachings are described hereinafter with reference to the accompanying drawings.

Figure 4A:
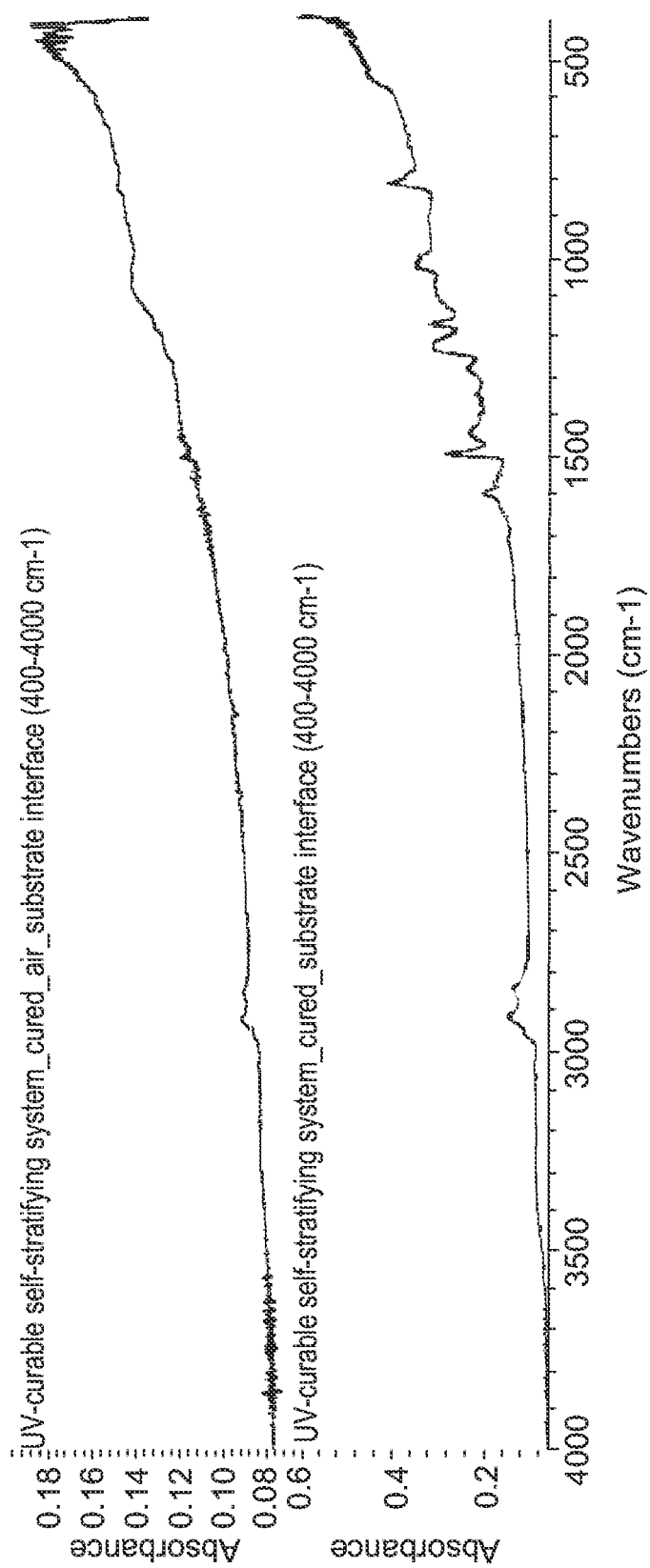
FIG. 4A shows an IR overlay of the UV-curable, self-stratifying system, with the top spectrum being the air coating interface, and the bottom spectrum being the substrate coating interface.
Figure 4B:
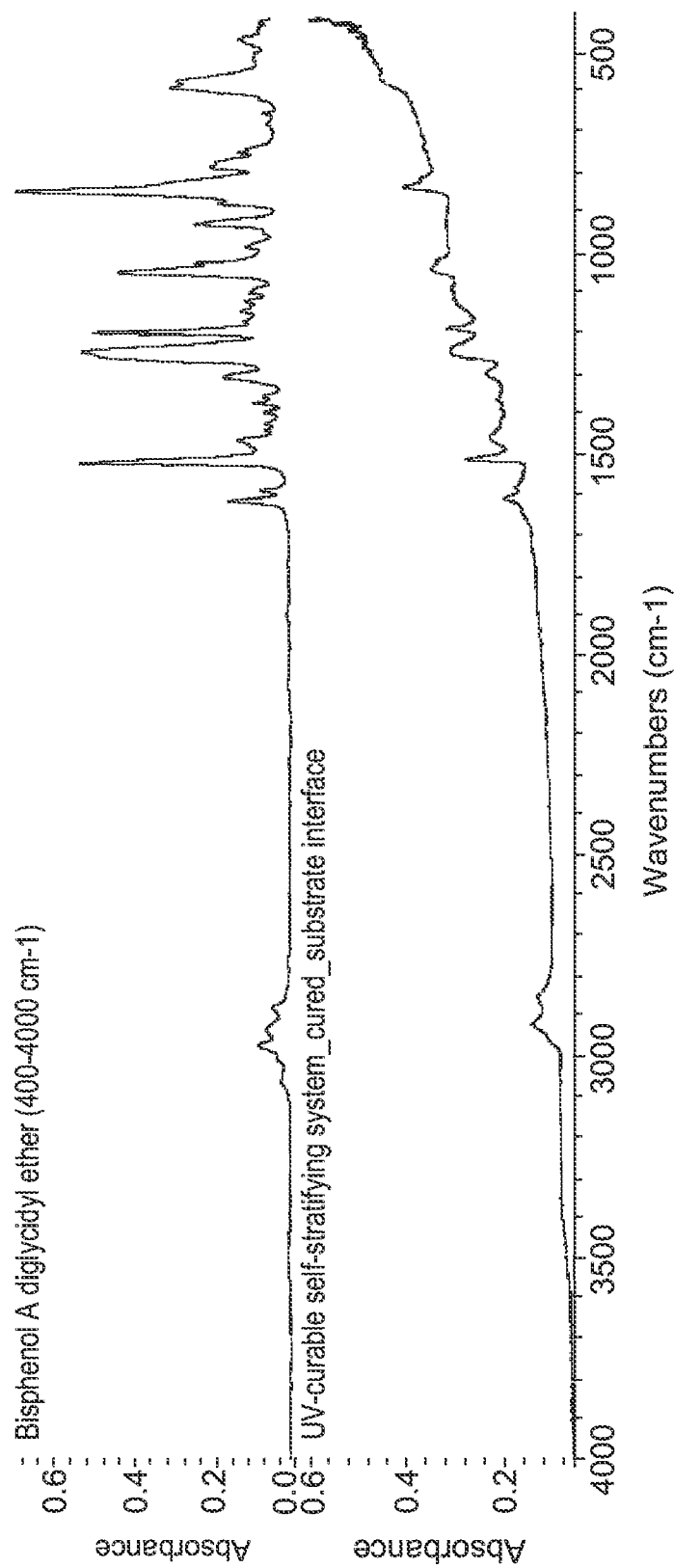
Figure 4C:
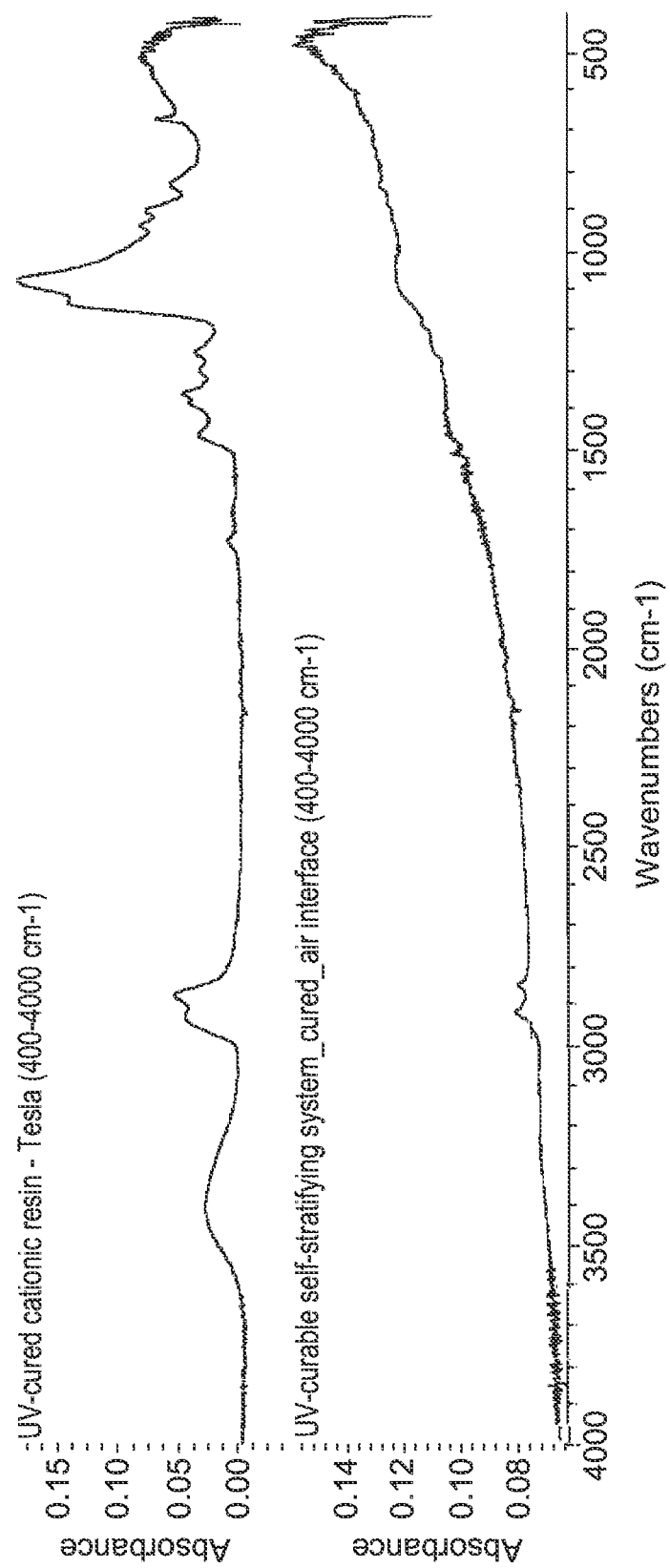

FIG. 4B shows an IR overlay of the UV-curable, self-stratifying system, with the top spectrum being the photoinitiator and vinyl ether mixture after UV curing, and the bottom spectrum being the air coating interface; and FIG. 4C shows an IR overlay of the UV-curable, self-stratifying system, with the top spectrum being bisphenol A diglycidyl ether, and the bottom spectrum being the substrate coating interface.

IV. DEFINITIONS

Self-stratifying coating: A single coating material that is a mixture of at least two different materials, can be applied on a surface using a single process, and after application the components form two or more layers.

Primer or bottom layer: A coating layer that is in contact with the substrate.

Top coat or top layer: A coating layer that is in direct contact with the air.

External effector: Chemical or physical factor outside of the coating that induces curing of a monomer after application. The external effector may be water, a common curing agent, such as amine, or a physical factor, such as electromagnetic radiation.

V. DETAILED DESCRIPTION

Figure 1:
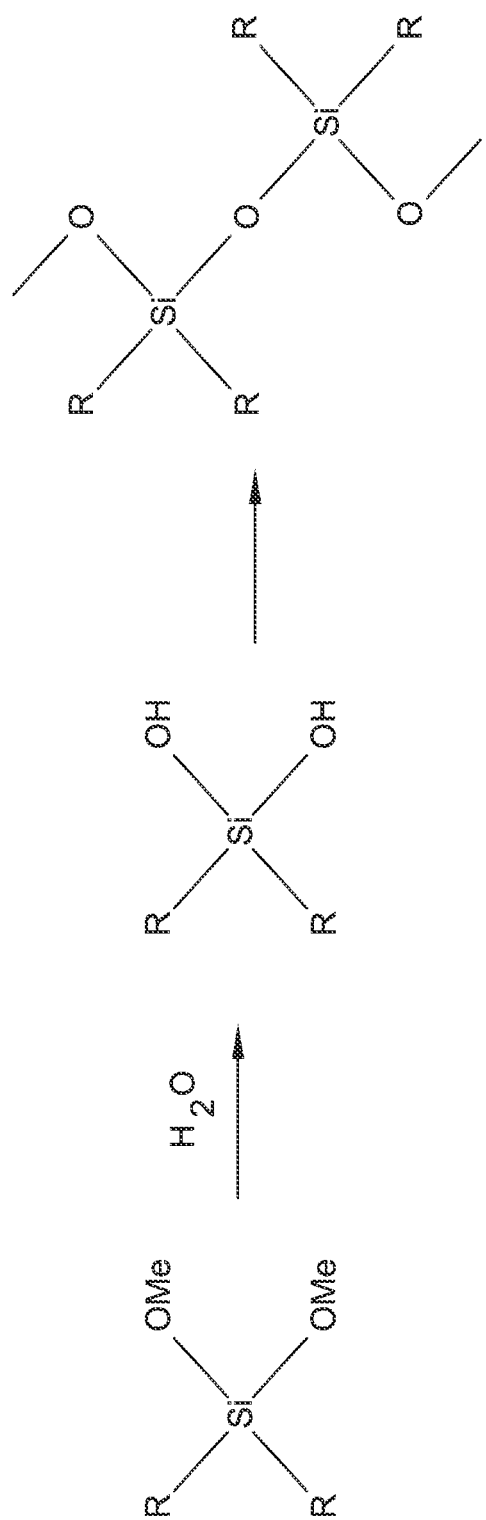
FIG. 1 shows the formation of a siloxane.

FIG. 1 depicts dimethoxysilane. It has two other moieties attached to the silicon. These may be alkyl, aryl groups, or contain functional groups, such as alkoxy, carbonyl, or amino groups. Alkoxy-, dialkoxy, trialkoxy, or tetra-alkoxysilanes may be used. Trialkoxy and tetra-alkoxysilanes lead to cross-linking and give a more glass-like coating. Methoxy groups are hydrolyzed easily. The resulting silicic acid derivative will spontaneously polymerize, releasing some of the water that was used in the first step. However, more water is needed to complete the process. In the present teaching, the water comes from humid air. Thus, in this aspect, water is an external effector.

In one aspect of the present teaching, the monomer in the primer is epoxy that is cured by amine. Many other curing agents are possible, including thiols, phenols, and carboxylic anhydrides. Curing of epoxy does not interfere with siloxane curing, and vice versa. Although to ensure binding of the primer and topcoat, some aminoalkyl dialkoxy-, or trialkoxy silane may be added into the mixture. The amino group will bind with the epoxy, and dimethoxysilane will bind with the siloxane layer.

In order to prevent siloxane formation inside the coating some water scavengers are added. There may be water on the surface of the substrate, and this could lead to significant siloxane formation. Also, industrial epoxies may contain small amounts of water. Thus, siloxanes could be formed evenly inside the coating. In order to suppress the formation of siloxanes, liquid and solid water scavengers may be added. Liquid scavengers remove water from the surface of the substrate effectively. However, it may also remove water too effectively from the air interface. Thus, only a relatively small amount of liquid water scavenger is used, unless the substrate is wet. Solid water scavengers, such as molecular sieves, silica, and many metal salts and oxides, do not move much inside the coating, and keep the interior of the coating dry. Combining liquid and solid water scavengers prevents the polymerization of siloxanes at the metal-coating interface, as well as inside the coating. Polymerization may only happen at the air interface. This leads to automatic separation of the primer and topcoat. This process may be further amplified by choosing monomers that mix poorly with each other. Mixing happens during fabrication only because suitable solvents are used, and uniform product is obtained.

Figure 2A:
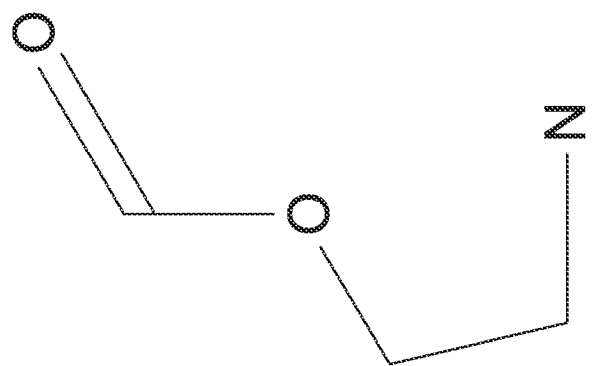
FIG. 2A shows the cleaving of oxazolidine.
Figure 2A:
Figure 2A:
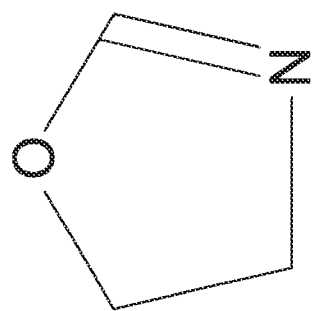
Figure 2B:
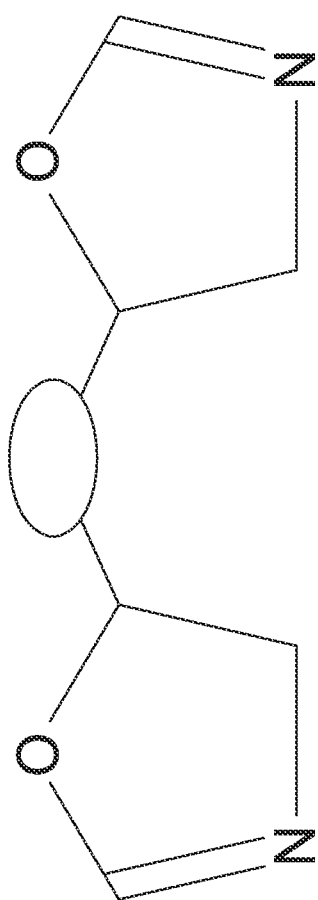
FIG. 2B shows a dimeric oxazolidine.

Oxazolidines are one example of a liquid water scavenger (FIG. 2A). Water cleaves the double bond, and a primary amino group is released. This will react with epoxy, which might be harmful. However, dimeric oxazolidine (FIG. 2B) forms a diamine that can act as a curing agent for epoxies and would be beneficial.

In another aspect of the present teaching, epoxy primer and polyurea topcoat can also be used. In this case epoxy monomer and di-isocyanate are mixed, and anticorrosive components are added. Dimeric oxazolidine is added in a large enough quantity so that after hydrolysis, the diamine that is formed from the dimeric oxazolidine will cure both di-isocyanate and epoxy. The diamine chemically bonds to the epoxy. A hydrolysis reaction will occur at the air-coating surface, di-isocyanate will react much faster than the epoxy, and a ureapolymer will be formed at the interface. Di-isocyanate molecules will diffuse close to the surface, where they will be trapped. Zinc and other micron sized particles will move very slowly, and mainly stay in the epoxy layer, as is desirable. If molecular dyes are used, they may also diffuse close to the surface. When all of the di-isocyanate has been consumed, the curing of the primer occurs.

It is general consensus that in order to get effective cathodic protection, the concentration of sacrificial metal particles should be above 50 wt %, and normally over 70 wt %. These limits might be lower if the polymer matrix is an electrically conducting polymer. Sacrificial metal particles can consist mainly of nearly spherical particles (nearly spherical includes microscopic, irregular surface structure). However, a portion of the sacrificial particles may have a flake-like structure. This will increase the electrical conductivity and the galvanic activity.

Sacrificial particles may, in principle, be made of any metal that has more positive redox potential than iron. Most positive ones, such as alkali metals, react too quickly with oxygen and water, and are not practical. Commonly used sacrificial metals include zinc, magnesium, and aluminum. Some alloys can be used, including zinc/magnesium alloy.

In another aspect of the present teachings, about 20 wt % Zn flakes are used to obtain a mirror effect that prevents light from penetrating into the lower half of the coating. Similarly, it can be estimated that about 1 wt % CNTs limit light to the upper half of the coating. The combination of about 10-30 wt % Zn flakes and about 0.5-2.0 wt/o CNTs/or graphene can be used. A mirror effect allows light to travel twice through the top layer, and accordingly the curing is faster than with absorbing particles.

In another aspect of the present teachings, in order to provide barrier properties, primer monomer or polymer is utilized in the composition. In one aspect, the primer monomer, or polymer in the composition, comprises more than about 15 wt %, and in another aspect, more than about 20 wt % is utilized. An epoxy resin can be used in the present teachings. Topcoat monomer, or polymer, can be about 10 wt % to about 20 wt % of the composition.

Conducting material may be graphitic material, such as carbon nanotubes or graphene, which may have many forms. For example, CNTs may be single walled (SWNT), double walled (DWNT), or multiwalled (MWNT). Graphene may be single sheet, double sheet, or multi sheet. Mixtures of CNTs and graphene can also be used. The amount of graphitic material can be about 0.1-2 wt/o of the primer polymer.

Figure 3A:
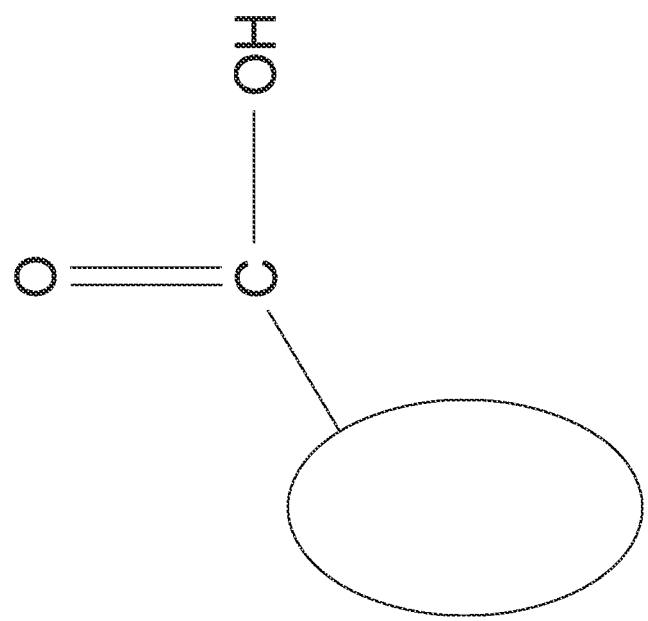
FIGS. 3A and 3B show the schematics of a dye incorporated into a siloxane layer.
Figure 3A:
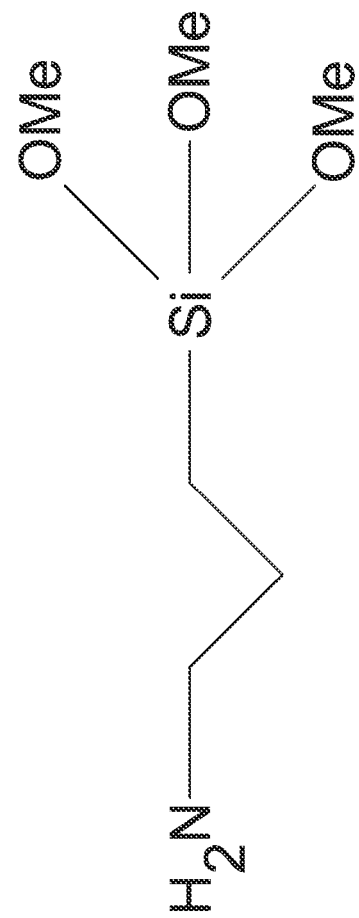
Figure 3B:
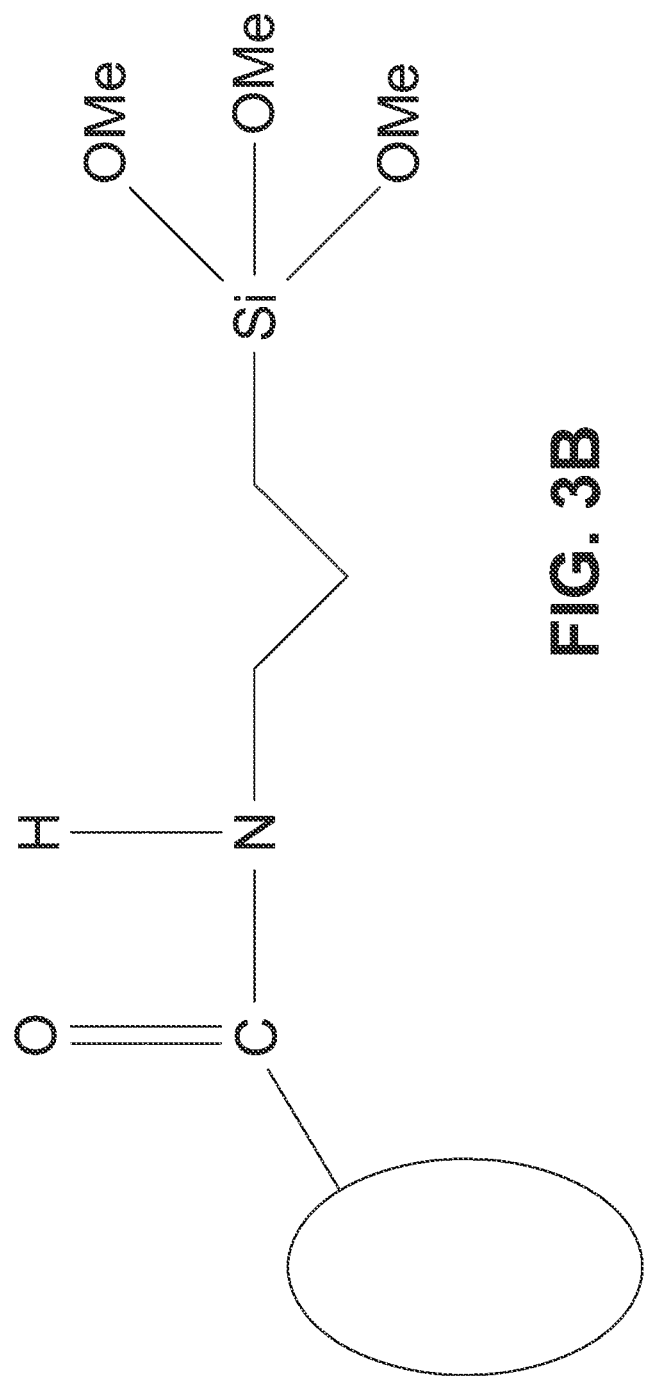

Dyes may be added to the mixture. Dyes typically have many functional groups that may be bound with silanes, so that dyes will be chemically bound with the topcoat. In FIG. 3 schematics depict how a carboxylic group of a dye may be connected with an amino group that is part of a silane. Large numbers of different reactive dyes are commercially available. They have been mostly developed for fabrics, but many of them are applicable for the self-stratifying coating of the present teaching.

Graphitic materials effectively absorb electromagnetic radiation, which allows photoinduced self-stratification. If the topcoat is made of photopolymerizable material, polymerization will only occur on the surface when the coating is radiated after application. Electromagnetic energy does not penetrate the wet coating, because graphitic material reflects or absorbs the radiation. In addition, the sacrificial metal particles, especially flakes, reflect electromagnetic radiation. Thus, the topcoat is automatically formed only on the surface once the monomers diffuse into the surface layer. In one aspect of the present teaching, the external effector is a photon. Suitable monomers and resins that can be used in radiation-curable compositions include those with acrylate, methacrylate, vinyl ether, cycloaliphatic epoxide, oxetane, or epoxide functionality.

With respect to radiation curing, an appropriate photoinitiator is required to initiate the radiation curing mechanism. An ultraviolet or visible light photoinitiator can be used. The choice of photoinitiator will depend upon the functionality of the polymerizable group (i.e. whether the system cures by means of free-radical or cationic processes). In one aspect of the present teaching, suitable photoinitiators are those which initiate polymerization upon exposure to radiation between about 200 nm to about 700 nm. Suitable photoinitiators, for example, include 1-hydroxy-cyclohexyl-phenyl-ketone, 2-hydroxy-1-[4-(2-hydroxyethoxy)phenyl]-2-methyl-1-propanone, 2,2-dimethoxy-2-phenylacetophenone, Bis(2,4,6-trimethylbenzoyl)-phenylphosphine oxide, triphenyl sulfonium triflate, triaryl sulfonium hexafluoroantimonate salts, and triaryl sulfonium hexafluorophosphate salts. These can be used alone or in combination with one another. Combinations are useful to achieve adequate surface cure and through cure.

Photoinitators that initiate polymerization in the wavelength of visible light can be used for field applications. These include those which absorb between about 380 nm to about 740 nm. Suitable photoinitiators of this type, for example, include bis(eta 5-2,4-cyclopentadien-1-yl)-bis(2, 6-difluoro-3-(1H-pyrrol-1-yl)-phenyl)titanium, 5,7-diiodo-3-butoxy-6-fluorone, 2,4,5,7-tetraiodo-3-hydroxy-6-fluorone, and 2,4,5,7-tetraiodo-3-hydroxy-9-cyano-6-fluorone.

While the present teaching provides separated layers, the separation may not be 100%. A lack of total separation can provide additional adhesion between the layers.

EXAMPLES

Example 1

A primer composed of 181 g of Epon™ 828 (an undiluted clear difunctional bisphenol A/epichlorohydrin derived liquid epoxy resin), 121 g 2.9% MWNT dispersion in Aromatic 100 (solvent naphtha), 18 g t-Butyl acetate, 4.1 g Disparlon™ 6500 (a non-reactive polyamide thixotrope), 1.2 g Thixotrol™ ST (rheology additive, which is a modified derivative of castor oil), 423 g UP #6 zinc dust, 212 g zinc flakes, 54 g Zn/Mg alloy, 54 g epoxidized glass flakes, 32 g Aromatic 100, 1.2 g phenyl trimethoxy silane, and 2 g glycidoxypropyl triethoxy silane.

In to 90 g of the primer mixture from the previous paragraph was added 10 g of 4 Å molecular sieve powder (Sylosiv™ 4A, GraceDavison). A silane stock mixture was made by mixing dimethyl dimethoxy silane (16 g), phenyl trimethoxy silane (4 g), and aminopropyl trimethoxy silane (2 g), and 10 g of this mixture was added into 10 g of the primer mixture. Into 10 g of this primer mixture was added 1 g of Ancamide™ 2767 (a high-performance modified polyamide curing agent), and a 5 mil film was spread on a propylene sheet using a drawdown bar. The coating was allowed to cure for one week at ambient temperature. The coating was removed from the propylene sheet, and IR spectra were recorded at several spots at the top and bottom surfaces (FIGS. 4A-4C). The spectra from the same side were identical, but different from each other. IR spectra reveal that there was very little epoxy on the top, and the bottom was almost exclusively epoxy. Thus, self-stratification had happened.

Example 2

A primer composed of 181 g of Epon™ 828, 121 g 2.9% MWNT dispersion in Aromatic 100, 18 g t-Butyl acetate, 4.1 g Disparlon™ 6500, 1.2 g Thixotrol™ ST, 423 g UP #6 zinc dust, 212 g zinc flakes, 54 g Zn/Mg alloy, 54 g epoxidized glass flakes, 32 g Aromatic 100, 1.2 g phenyl trimethoxy silane, and 2 g glycidoxypropyl triethoxy silane.

To the above primer was added 30 g triethylene glycol divinyl ether, 3 g diethylene glycol monovinyl ether, and 0.3 g triaryl sulfonium hexafluorophosphate salts in propylene carbonate (50% by weight). A portion of the mixture (10 g) was mixed with 1 g of Ancamide™ 2767 and cast, using a 5-mil drawdown bar, onto a polypropylene sheet. After 4 hours, the film was exposed to high-intensity UV radiation using a UV-spot curing system. The sample was exposed to radiation for 1 minute at a distance of 10 cm from the light source to the sample.

The present teaching allows for one spraying of material. The primer and top coat are mixed, and then the two separate upon contact to form two layers. Normally, the mixture would be immiscible, but is made miscible by the solvent. In one aspect of the present teachings, the top coat is a water soluble top coat, which can be achieved using siloxanes. In one aspect of the present teachings, silane is hydrolyzed, which creates silicic acid, which then spontaneously polymerizes into siloxane. The hydrolyzation of the silane can be caused by humidity in the ambient air.

In another aspect of the present teaching, no insulating layer is used. A molecular sieve can be used, to act as a porous material that only allows water through. No other molecules would be able to penetrate. The molecular sieve can remove water from the inside of the coating, as well as water from the metal substrate. No polymerization will occur on the metal substrate. In another aspect, a diamino group can be used as a curing agent for the epoxy. This curing agent can be added by the customer to the coating. The epoxy will typically polymerize in a matter of hours.

In another aspect of the present teaching, sunlight can be used to create polymerization. The sunlight, however, will not penetrate all the way through the coating due to the black carbon nanotubes, as well as the sacrificial metal flakes which reflect light.

Clause 1—A self-stratifying anticorrosive coating includes a zinc-rich epoxy, a curing agent chosen from the group consisting of amines, thiols, phenols, and carboxylic anhydrides, a binding agent chosen from the group consisting of aminoalkyl dialkoxysilane, dimethoxysilane, and aminoalkyl trialkoxysilane, a graphitic material, a solvent, a water scavenger, and a moisture-cured siloxane.

Clause 2—A self-stratifying anticorrosive coating includes sacrificial metal particles, graphitic material, a mixture of at least two different monomers or polymers, and a material that prevents the polymerization of at least one monomer inside the coating.

Clause 3—The coating of clause 2 further includes a curing agent and a binding agent.

Clause 4—The coating of clauses 2 or 3, wherein the at least two different monomers or polymers are chosen from the group consisting of epoxies, polyurethane, acrylates, methacrylates, vinyl ethers, cycloaliphatic epoxides, oxetanes, epoxides, photopolymers, siloxanes, and polyurea.

Clause 5—The coating of clauses 2-4, wherein the graphitic material is chosen from the group consisting of single walled carbon nanotubes, double walled carbon nanotubes, multiwalled carbon nanotubes, single sheet graphene, double sheet graphene, or multi-sheet graphene.

Clause 6—The coating of clauses 2-5, wherein the material that prevents the polymerization of at least one monomer inside the coating is a water scavenger chosen from the group consisting of liquid water scavengers, molecular sieves, silica, metal salts, and metal oxides.

Clause 7—The coating of clauses 2-6, wherein the sacrificial metal particles are chosen from the group consisting of any metal that has more positive redox potential then iron.

Clause 8—The coating of clauses 2-7, wherein the sacrificial metal particles are chosen from the group consisting of zinc, magnesium, aluminum, and alloys thereof.

Clause 9—The coating of clauses 2-8, wherein the curing agent is chosen from the group consisting of amines, thiols, phenols, and carboxylic anhydrides, and the binding agent is chosen from the group consisting of aminoalkyl dialkoxysilane, dimethoxysilane, and aminoalkyl trialkoxysilane.

Clause 10—The coating of clauses 2-9, wherein the coating further comprises a photoinitiator chosen from the group consisting of 1-hydroxy-cyclohexyl-phenyl-ketone, 2-hydroxy-1-[4-(2-hydroxyethoxy)phenyl]-2-methyl-1-propanone, 2,2-dimethoxy-2-phenylacetophenone, Bis(2,4,6-trimethylbenzoyl)-phenylphosphine oxide, triphenyl sulfonium triflate, triaryl sulfonium hexafluoroantimonate salts, triaryl sulfonium hexafluorophosphate salts, bis(eta 5-2,4-cyclopentadien-1-yl)-bis(2,6-difluoro-3-(1H-pyrrol-1-yl)-phenyl)titanium, 5,7-diiodo-3-butoxy-6-fluorone, 2,4,5,7-tetraiodo-3-hydroxy-6-fluorone, and 2,4,5,7-tetraiodo-3-hydroxy-9-cyano-6-fluorone.

Clause 11—A method for a self-stratifying anticorrosive coating on an associated substrate including the steps of mixing together a polymer, a solvent, a graphitic material, and sacrificial metal particles, adding a material that prevents polymerization inside the coating before, and immediately after application on the associated substrate, adding a silane mixture.

Clause 12—The method of clause 11 further comprising the steps of adding a curing agent and applying, in one spraying, the mixture of the epoxy resin, the solvent, the graphitic material, and the sacrificial metal particles, the silane mixture, and the curing agent to the associated substrate, wherein an external effector hydrolyzes the silane mixture creating silicic acid, wherein the silicic acid spontaneously polymerizes into siloxane.

Clause 13—The method of clauses 11 or 12, wherein no insulating layer is used.

Clause 14—The method of clauses 11-13 wherein the external effector is ambient moisture or photons.

Clause 15—The method of clauses 11-14, wherein the polymer is chosen from the group consisting of epoxies, acrylates, methacrylates, vinyl ethers, cycloaliphatic epoxides, oxetanes, epoxides, photopolymers, siloxanes, and polyurea.

Clause 16—The method of clauses 11-15, wherein the graphitic material is chosen from the group consisting of single walled carbon nanotubes, double walled carbon nanotubes, multiwalled carbon nanotubes, single sheet graphene, double sheet graphene, or multi-sheet graphene.

Clause 17—The method of clauses 11-16, wherein the material that prevents the polymerization inside the coating is a water scavenger chosen from the group consisting of liquid water scavengers, molecular sieves, silica, metal salts, and metal oxides.

Clause 18—The method of clauses 11-17, wherein the sacrificial metal particles are chosen from the group consisting of any metal that has more positive redox potential then iron.

Clause 19—The method of clauses 11-18, wherein the sacrificial metal particles are chosen from the group consisting of zinc, magnesium, aluminum, and alloys thereof.

Clause 20—The method of clauses 11-19, wherein the coating further comprises a photoinitiator chosen from the group consisting of 1-hydroxy-cyclohexyl-phenyl-ketone, 2-hydroxy-1-[4-(2-hydroxyethoxy)phenyl]-2-methyl-1-propanone, 2,2-dimethoxy-2-phenylacetophenone, Bis(2,4,6-trimethylbenzoyl)-phenylphosphine oxide, triphenyl sulfonium triflate, triaryl sulfonium hexafluoroantimonate salts, triaryl sulfonium hexafluorophosphate salts, bis(eta 5-2,4-cyclopentadien-1-yl)-bis(2,6-difluoro-3-(1H-pyrrol-1-yl)-phenyl)titanium, 5,7-diiodo-3-butoxy-6-fluorone, 2,4,5,7-tetraiodo-3-hydroxy-6-fluorone, and 2,4,5,7-tetraiodo-3-hydroxy-9-cyano-6-fluorone, wherein the curing agent is chosen from the group consisting of amines, thiols, phenols, and carboxylic anhydrides, and the binding agent is chosen from the group consisting of aminoalkyl dialkoxysilane, dimethoxysilane, and aminoalkyl trialkoxysilane.

The various aspects have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof. Although the description above contains much specificity, this should not be construed as limiting the scope of the present teachings, but as merely providing illustrations of some of the aspects of the present teachings. Various other aspects and ramifications are possible within its scope.

Furthermore, notwithstanding that the numerical ranges and parameters setting forth the broad scope of the present teachings are approximations, the numerical values set forth in the specific examples are reported as precisely as possible. Any numerical value, however, inherently contain certain errors necessarily resulting from the standard deviation found in their respective testing measurements.

We claim:

1. A method of curing a primer, the method comprising the steps of:
    mixing an epoxy monomer with diisocyanate;
    adding dimeric oxazolidine to the mixture of epoxy monomer and diisocyanate, wherein a diamine is formed after hydrolysis;
    curing the epoxy monomer and the diisocyanate with the diamine; and
    chemically binding the diamine to the epoxy monomer, wherein when all of the diisocyanate has been consumed the curing of the primer occurs.

2. The method of claim 1, wherein the epoxy monomer contains metal particles, wherein substantially all of the metal particles remain in the epoxy monomer during the method.

3. The method of claim 1, wherein the method further comprises the steps of:
    forming a ureapolymer at an interface of the epoxy monomer and the diisocyanate; and
    trapping the diisocyanate close to a surface of the primer.

4. The method of claim 3, wherein the metal particles are chosen from the group consisting of zinc, magnesium, aluminum, and zinc/magnesium alloy.

5. The method of claim 3, wherein the metal particles are about 10 weight percent to about 30 weight percent zinc flakes, wherein the zinc flakes prevent light from penetrating.

6. A self-stratifying coating comprising:
    a primer comprising:
        difunctional bisphenol A/epichlorohydrin derived liquid epoxy resin;
        multi-walled carbon nanotube dispersion in solvent naphtha;
        a non-reactive polyamide thixotrope;
        metal particles; and
        silane;
    a top coat comprising:
        molecular sieve powder; and
        a silane mixture; and
    a polyamide curing agent.

7. The coating of claim 6, wherein the coating further comprises a rheology additive.

8. The coating of claim 7, wherein metal particles are a combination of zinc dust, zinc flakes, and zinc/magnesium alloy.

9. The coating of claim 8, wherein the coating further comprises epoxidized glass flakes.

10. The coating of claim 9, wherein the silane in the primer is phenyl trimethoxy silane and glycidoxypropyl triethoxy silane.

11. The coating of claim 10, wherein the silane mixture of the top coat is dimethyl dimethoxy silane, phenyl trimethoxy silane, and aminopropyl trimethoxy silane.

12. The coating of claim 11, wherein the rheology additive is a modified derivative of castor oil.

13. A method for a self-stratifying anticorrosive coating on an associated substrate comprising the steps of:
    mixing together a photopolymerizable material, a solvent, a graphitic material, and sacrificial metal particles;
    adding a material that prevents polymerization of the photopolymerizable material inside the coating before, and immediately after, application on the associated substrate;
    adding a silane mixture.

14. The method of claim 13 further comprising the steps of:
    adding a curing agent; and
    applying, in one spraying, the photopolymerizable material, the solvent, the graphitic material, the sacrificial metal particles, the material that prevents polymerization of the photopolymerizable material, the silane mixture, and the curing agent to the associated substrate, wherein an external effector hydrolyzes the silane mixture creating silicic acid, wherein the silicic acid spontaneously polymerizes into siloxane.

15. The method of claim 14, wherein no insulating layer is used.

16. The method of claim 14 wherein the external effector is photons.

17. The method of claim 13, wherein the photopolymerizable material is chosen from the group consisting of, acrylates, methacrylates, vinyl ethers, cycloaliphatic epoxides, oxetanes, photopolymers, and epoxide functionalities.

18. The method of claim 17, wherein the graphitic material is chosen from the group consisting of single walled carbon nanotubes, double walled carbon nanotubes, multi-walled carbon nanotubes, single sheet graphene, double sheet graphene, or multi-sheet graphene.

19. The method of claim 18, wherein the material that prevents the polymerization inside the coating is a water scavenger chosen from the group consisting of liquid water scavengers, molecular sieves, silica, metal salts, and metal oxides.

20. The method of claim 19, wherein the sacrificial metal particles are chosen from the group consisting of any metal that has more positive redox potential then iron.

* * * * *